(12) United States Patent
Koch et al.

(10) Patent No.: US 6,883,752 B2
(45) Date of Patent: Apr. 26, 2005

(54) VIBRATION DAMPER FOR AIRCRAFT ENGINE

(75) Inventors: Thomas Koch, Vienna (AT); Johann Bayerl, Gunskirchen (AT)

(73) Assignee: BRP-Rotax GmbH & Co. KG., Gunskirchen (AT)

( * ) Notice: Subject to any disclaimer, the term of this patent is extended or adjusted under 35 U.S.C. 154(b) by 97 days.

(21) Appl. No.: 10/071,233

(22) Filed: Feb. 11, 2002

(65) Prior Publication Data

US 2003/0089822 A1 May 15, 2003

Related U.S. Application Data

(60) Provisional application No. 60/341,874, filed on Dec. 21, 2001, and provisional application No. 60/331,380, filed on Nov. 14, 2001.

(51) Int. Cl.[7] .............................................. B64D 35/00
(52) U.S. Cl. ................... 244/60; 244/17.11; 244/17.27; 74/574; 74/604; 416/140
(58) Field of Search .......................... 244/17.11, 17.27, 244/60; 416/140; 74/574, 604

(56) References Cited

U.S. PATENT DOCUMENTS

| | | | | | |
|---|---|---|---|---|---|
| 1,503,356 A | * | 7/1924 | Elliott | ......................... | 244/60 |
| 1,701,518 A | * | 2/1929 | Walker | ....................... | 74/574 |
| 1,838,023 A | * | 12/1931 | Manville | ...................... | 74/574 |
| 1,884,480 A | * | 10/1932 | Woolson | ...................... | 74/574 |
| 1,913,803 A | * | 6/1933 | Griswold | ...................... | 74/574 |
| 1,962,746 A | * | 6/1934 | Lee | ............................ | 74/574 |
| 1,984,577 A | * | 12/1934 | Griswold | ...................... | 74/574 |
| 2,041,507 A | * | 5/1936 | Zeder | ........................... | 74/574 |
| 2,142,178 A | * | 1/1939 | Cole et al. | .................... | 74/574 |
| 2,333,122 A | * | 11/1943 | Prescott | ....................... | 74/574 |
| 2,369,679 A | * | 2/1945 | Matteucci | ..................... | 74/574 |
| 2,440,956 A | * | 5/1948 | Kearns, Jr. et al. | ............ | 74/574 |
| 2,480,946 A | * | 9/1949 | McDowall et al. | ............. | 74/574 |
| 2,492,029 A | * | 12/1949 | Beier | | |
| 2,880,626 A | * | 4/1959 | Nallinger | ...................... | 74/604 |
| 3,540,809 A | * | 11/1970 | Paul et al. | | |
| 3,861,828 A | * | 1/1975 | Biermann et al. | ............. | 74/574 |
| 5,931,052 A | * | 8/1999 | Zhao et al. | .................... | 74/574 |
| 6,299,541 B1 | * | 10/2001 | Bertin et al. | | |
| 6,402,621 B1 | * | 6/2002 | Cooke et al. | | |

OTHER PUBLICATIONS

"Overhaul Manual for TIARA Aircraft Engine," Teledyne Industries, Inc., Mar. 1979, 7 pages.
"Illustrated Parts Catalog for the TIARA 6–285 and 6–320 Aircraft Engine," Mar., 1977, 2 pages.
Dorsch, et al.; "Der Porsche–Flugmoto PFM 3200 (The Porsche Aircraft Engine PFM 3200)," Motortochnizche Zeitschrift 46 (apparently dated Jul./Aug., 1985) 7/8, pp. 275–281.
"Porsche Flugmotor PFM 3200 (The Porsche PFM 3200 Aircraft Engine)," partial product specification, (undated), 4 pages (however, the engine appears to be the same as in reference "XR", above.).

* cited by examiner

Primary Examiner—Michael J. Carone
Assistant Examiner—Lulit Semunegus
(74) Attorney, Agent, or Firm—BRP Legal Services

(57) ABSTRACT

An internal combustion engine for an aircraft is described. The internal combustion engine includes a crankshaft defining first and second ends, a propeller, and a transmission disposed between the first end of the crankshaft and the propeller, operatively connecting the propeller to the crankshaft. A torsion bar is disposed between the first end of the crankshaft and the transmission, operatively connecting the crankshaft to the transmission. A torsional vibration damper is operatively connected at one of the first and the second ends of the crankshaft.

32 Claims, 2 Drawing Sheets

VIBRATION DAMPER FOR AIRCRAFT ENGINE

This non-provisional application claims priority from U.S. Provisional Patent Application Ser. No. 60/331,380 filed on Nov. 14, 2001, and U.S. Provisional Patent Application Ser. No. 60/341,874 filed on Dec. 21, 2001, the contents of both provisional applications are incorporated herein by reference.

FIELD OF THE INVENTION

The present invention relates to a drive unit for vehicles with internal combustion engines. In particular, the present invention relates to aircraft, which comprises at least one engine, reduction gearing, and a device for decoupling or reducing the torsional vibration in the drive line.

BACKGROUND OF THE INVENTION

Typically, propeller-driven aircraft incorporate noise emission controls in two main component areas: (1) the propeller and (2) the exhaust system.

It is known in the art that effective reduction of the noise burden imposed on third parties is achieved only by simultaneously reducing the speed of rotation of the propeller and by muffling the noise of the exhaust. This is particularly so in the case of high-performance engines that have high power densities at high rotational speeds.

It is known that, to minimize the noise generated by propellers in high-performance engines, reduction gearing is needed to reduce the high rotational speed of the crankshaft and to increase the torque on the propeller shaft. In principal, a propeller should only rotate at such a speed that its peripheral velocity is lower than the speed of sound. If the speed of the blades of a propeller approach or exceed the speed of sound, such high speeds result in unacceptable noise emissions and losses of operational efficiency.

The diameter of the propeller factors into the maximum speed of rotation before the propeller begins to generate unacceptable levels of noise. Smaller diameter propellers permit higher speeds of rotation because of the peripheral velocity of smaller propellers is less than that of larger diameter propellers. However, smaller diameter propellers are less efficient than larger diameter propellers. Accordingly, the propeller designer's challenge is to select the best possible compromise between efficiency (i.e., propeller diameter) and the speed of rotation of the propeller for a given power output. For power outputs in the range from 50 to 300 kW, such optimal propeller diameters are typically in the range from 1.5 to 2.2 m. The associated speed of rotation of the propeller is calculated from the selected blade-tip velocity which, as discussed above, should be lower than the speed of sound, and generally be in the range from 200 to 270 m/sec.

Other factors that impact on propeller performance and noise emission are the moment of inertia of the propeller and the moment of inertia of the drive system to which the propeller is connected. The moments of inertia of the propeller and drive system can create operational imbalances that contribute to noise generation during operation of the aircraft engine.

The diameter of the propeller contributes to the moment of inertia of the propeller. The larger the diameter of the propeller, the greater the moment of inertia. Following this rule, a relatively large propeller diameter means that the propeller has a relatively high moment of inertia.

Each of the other components of the engine that rotate together with the propeller contribute to the moment of inertia of the propeller system. The propeller system components include, for example, the components of the drive line such as the crankshaft and the reduction gearing that is arranged between the crankshaft and the propeller.

As a general rule, the moments of inertia of the propeller and propeller system constitute an oscillating system that is characterized by a plurality of natural frequencies (fundamental component and harmonics). The operation of this oscillating system is excited by the torque pulsations of the reciprocating engine. If the frequency of excitation coincides with a natural frequency, this results in resonant vibrations that can produce unacceptable vibration of the drive unit. This results in noise.

Moreover, vibrations created by the oscillating system can also result in excessive wear of the engine components. If present, a high level of local acceleration can produce vibrations that may damage the engine or its associated components. In addition, the creation of such vibrations can lead, for example, to loss of auxiliary assemblies (e.g., generators) or to the failure of various engine components (which is a phenomenon referred to as "vibration failure").

Furthermore, resonant vibrations in the intermediate gearing, which is usually spur-gear reduction gearing, may result in accelerated gear wear. Resonant vibrations also may lead to the creation of additional noise as a result of the ever-present tooth backlash and the associated, shock-like tooth contact. In addition, impact stresses in the gears may shorten greatly the useful life of the reduction gearing.

At least for these reasons, reducing engine vibrations not only reduces noise pollution, but also prolongs the service life of the engine. Generally speaking, every effort should be made to avoid spurious resonant vibrations in the operating-speed range of the engine. As a rule, this cannot be done if the propeller and the crankshaft are coupled rigidly, either with or without intermediate reduction gearing.

One solution presented by the prior art is called the "Sarazin pendulum." While it is true that so-called Sarazin pendulums, which are arranged on the crankshaft webs, can suppress or reduce resonance and vibrations in the crankshaft, they cannot (as a rule) eliminate the first fundamental frequency of the overall oscillating system, which is essentially determined by the propeller's moment of inertia. In addition, crankshafts that incorporate Sarazin pendulums are costly to make and (because of certain design features) are prone to failure. For this reason, the use of such devices is avoided as much as possible, at least in the design of aircraft engines.

It is also known in the prior art to arrange a torsionally-soft coupling between the crankshaft of the reciprocating engine and the propeller. The result of this arrangement is that the first natural frequency of the torsion-oscillating system is substantially lowered. Preferably, the first natural frequency is made lower than the idling speed of the reciprocating engine.

In 1985, in furtherance of this particular prior art solution, Porsche proposed to relieve the load on the crankshaft and the reduction gearing by installing a flexible rubber coupling (that incorporated textile inserts) between the crankshaft and the intermediate gearing. See *MTZ Motortechnische Zeitschrift* [MTZ Motor Magazine], No. 46 (1985). The flexible rubber coupling was designed to prevent torsional vibration resonance across the entire range of operating speeds. It was also designed to smooth out torsional pulsations out in the drive line between the crankshaft and the propeller shaft.

Despite the advantages offered by this solution, it has been shown that, because of internal friction, a flexible rubber coupling of the kind proposed by Porsche is prone to a comparatively large amount of wear during operation. For this reason, among others, the flexible rubber coupling must be replaced at frequent intervals in order to ensure sufficient operating reliability of the drive unit. In addition, it has been discovered that lowering the natural frequency of the oscillating system may give rise to spurious resonance phenomena when the engine is started, unless additional remedial measures are adopted.

In 1979, Teledyne Industries, Inc. proposed another design for a drive unit to reduce noise generation and component wear. The Teledyne solution was to provide two drive lines between the crankshaft and the propeller. See *Overhaul Manual for TIARA Aircraft Engine*, Teledyne Industries, Inc., 1979. Each of the two drive lines were provided with different natural frequencies. The first line had a torsionally soft drive line with a low natural frequency. The soft drive line comprised a torsionally soft torsion bar between the crankshaft and the propeller. The second had a torsionally stiff drive line with a higher natural frequency. The stiff drive line comprised a hydraulic coupling.

The torsionally stiff drive line bypassed the torsion bar referred to above and could be partially activated. In the lower speed range (particularly at engine start-up), the torsionally stiff drive line was active, which is to say the torsionally soft torsion bar was bypassed, so that the drive line was operated below its natural frequency (fundamental oscillation). As engine speed increased, the hydraulic coupling was released and the torsion bar was activated, so that the torsionally soft drive line was operated above its resonant frequency.

The Teledyne design ensured that the drive unit never resonated and that unacceptably high stresses in the drive line were avoided. One disadvantage, however, was the fact that two drive lines were required, resulting in a more complex engine. In addition, a relatively costly coupling had to be provided. This entailed not only higher product costs, but also additional costs for controlling the coupling. Furthermore, each coupling was a part subjected to wear. The durability of the components had a significant influence on the service life of the overall drive unit and, thus, had a direct impact on the associated maintenance costs of the engine.

In summary, while the prior art has suggested adequate solutions to the problems identified, the prior art has failed to provide a simple, cost-effective solution to the problem of vibration and noise generation by an aircraft engine.

SUMMARY OF THE INVENTION

Therefore, it is one aspect of the present invention, inter alia, to provide a solution to the deficiencies enumerated with respect to the prior art discussed above.

It is another aspect of the present invention to provide a drive unit that avoids the disadvantages discussed heretofore, is as robust as possible, cost effective, simple to manufacture, and requires little maintenance.

Among other features, the present invention provides for a drive line that is torsionally soft.

In addition, the present invention provides for a torsional-vibration damper that is associated with the drive line.

Among other features, the present invention offers a simple solution to the difficulties associated with the design of prior art aircraft engines. The present invention provides a robust, low-maintenance drive unit for aircraft engines in which engine vibrations or the amplitude of oscillations in the drive line can be reduced across the entire speed range of the engine.

For the present invention, it is preferred that at least one torsionally soft element, for example, a torsion bar, be arranged between the crankshaft and the propeller to create a torsionally soft drive line. In this way, the first natural frequency of the drive line is lowered and the drive line may be operated supercritically at operating speeds, which is to say above its resonant frequency.

In the present invention, it is preferred that the torsionally soft element be arranged between the reduction gearing and the crankshaft, so that the two components of the drive line are decoupled with respect to vibration. For all practical purposes, higher frequency crankshaft vibrations are not transferred into the intermediate gearing.

For the present invention, it is preferred that the torsionally soft element reduce excitation of the reduction gearing imparted by the crankshaft. In this way, the gearing problems described heretofore (wear and noise) may be limited effectively.

In addition, it is preferred that a torsional-vibration damper be associated with the drive line to control vibration in the lower speed range (in particular when the engine is started).

For the present invention, it is preferred that the torsional-vibration damper be designed so that it acts against the resonant frequency (fundamental oscillation) of the torsionally soft drive line. It is preferred that a viscous vibration damper be used to minimize wear in the drive line (especially since such a damper wears very little during use and requires little maintenance). An additional advantage with such a construction is that the effective range of a viscous damper is so wide that even higher frequency vibrations can be dampened.

In the present invention, it is preferred that the viscous damper comprise an annular body mounted in a housing, that there be a clearance around the axis of rotation of the annular body, and that there be a viscous liquid in the space between the housing and the annular body. Accordingly, if a difference between the speed of rotation of the housing and the annular body should develop, the speed difference generates shear stresses in the viscous liquid. This gives rise to a more or less rigid coupling between the housing and the annular body, depending on the magnitude of this difference. Viscous dampers of this type are widely known in the prior art (see, e.g., Palsis Schwingungstechnik GmbH & Co., whose Internet website is www.palsis.de) and have been used for many years in internal combustion engines, for example truck engines and stationary engines.

In the specific application for an aircraft engine, as in the present invention, it is preferred that the viscous damper be installed on the end of the crankshaft that is remote from the propeller. In particular, it is preferred that the viscous damper be located directly on the crankshaft.

While it is contemplated that the viscous damper may be arranged on the end of the crankshaft that is proximate to the propeller, e.g., between the torsionally soft element (torsion bar) and the crankshaft, such an arrangement is not preferred. This second embodiment is not preferred because of the considerable size of the outside diameter of the viscous damper. While not impossible to construct, the second arrangement requires a wide space between the axis of the crankshaft and the axis of the propeller shaft. In other words, it increases the installed volume of the engine. In addition, such an arrangement creates problems related to securing the reduction gear housing.

As a part of the present invention, the outside diameter of the viscous damper is large by comparison with the diameter of the associated crankshaft. The large outside diameter of the viscous damper makes it possible to use the viscous damper simultaneously as a flywheel, which offers additional advantages. The large outside diameter also provides a convenient location on its outer periphery for a starter ring gear for starting the engine.

With its robust construction, the drive unit according to the present invention makes it possible to satisfy the demands made on the drive line for aircraft engines that would otherwise be difficult to meet. For example, the engine may be operated (normal operations) without any restriction on the range of engine speeds. In addition, the engine may be operated with one unserviceable cylinder (e.g., five-cylinder operation in a six-cylinder engine). Also, the demands made on the drive line may be met when the engine is being started or shut down.

BRIEF DESCRIPTION OF THE DRAWINGS

Various aspects of the present invention will be described in greater detail below with reference being made to the examples provided and the drawings appended hereto. The drawings, which are meant to be illustrative and which are not meant to limit the scope of the present invention, show the following.

DESCRIPTION OF THE PREFERRED EMBODIMENT(S)

Figure 1:
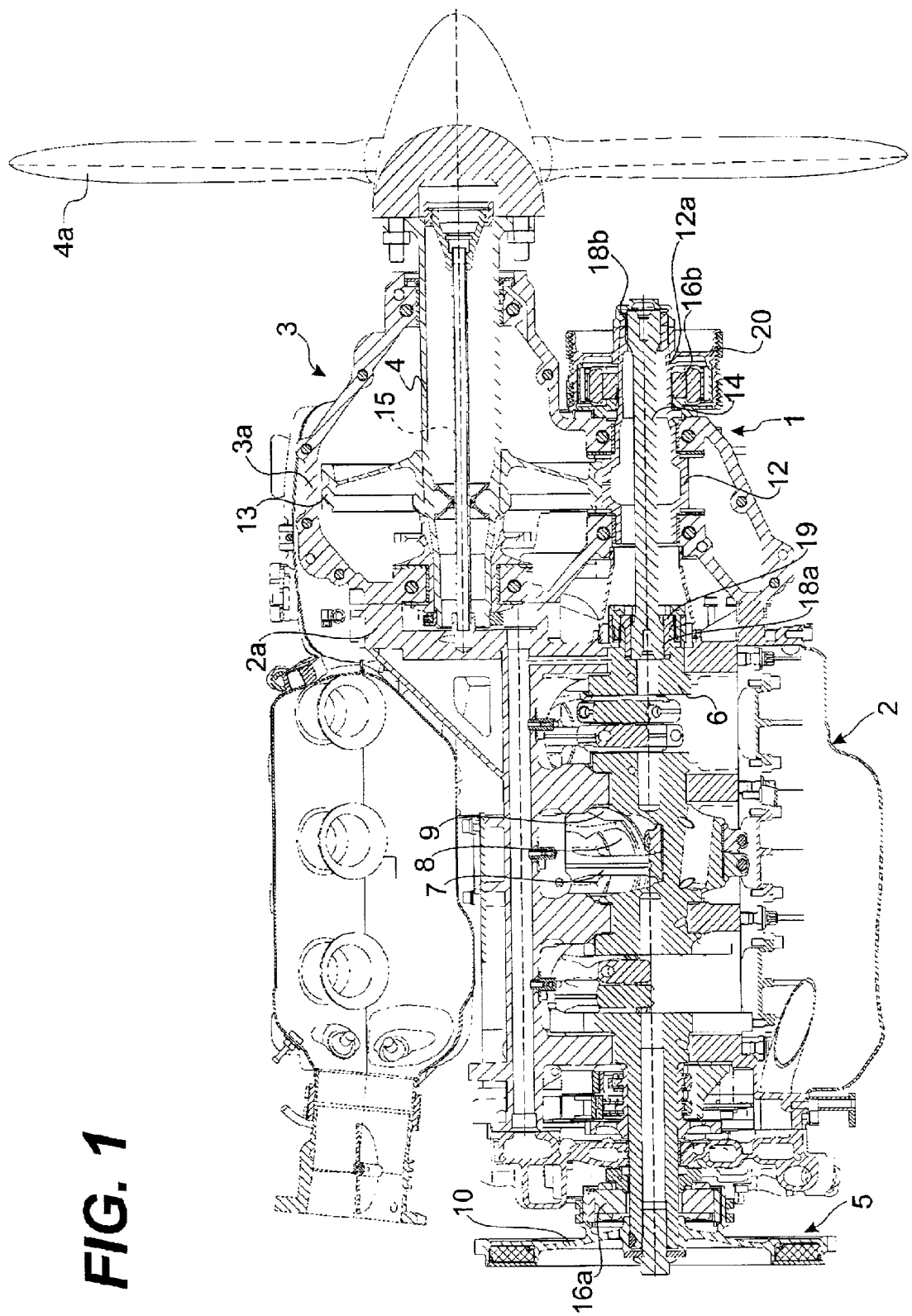
FIG. 1 is a side view of a drive unit for an aircraft, in a partial cross section.

As illustrated in FIG. 1, one preferred embodiment of a drive unit 1 for an aircraft comprises an internal combustion engine 2, a reduction gearing 3, a propeller 4a that is installed on a propeller shaft 4, and a torsional-vibration damper 5. For simplicity, the aircraft has been omitted from the various illustrations of the present invention. As would be appreciated by those skilled in the art, the particular configuration of the aircraft is not critical to practice the present invention. Accordingly, the present invention contemplates use on aircraft of any suitable design.

As illustrated in FIG. 1, the internal combustion engine 2 includes a crankshaft 6 to which connecting rods 7 are attached. The connecting rods 7 convert the linear, reciprocating movement of pistons 8 within the cylinders 9 into rotary movement of the crankshaft 6. A torsional-vibration damper 5 preferably is attached to the end of the crankshaft 6 that is remote from the propeller so as to be releasable therefrom. However, as indicated herein, the vibration damper 5 may be disposed at the opposite end of the crankshaft 6 or, alternatively, at an intermediate position along the crankshaft 6 (i.e., not solely at either end thereof).

In the example illustrated in FIG. 1, the torsional-vibration damper 5 is connected to the crankshaft 6 via a Woodruff key. In the preferred example, the torsional-vibration damper 5 is integrated into the disk flywheel 10 of the engine 2. However, in an alternate embodiment, the torsional-vibration damper 5 may constitute the disk flywheel itself.

A starter ring gear 11 for starting the engine is arranged on the outside periphery of the torsional-vibration damper 5. A starter motor pinion (not shown) engages the starter ring gear 11 (see, e.g., FIG. 2). On the side that is proximate to the crankshaft 6, the torsional-vibration damper 5 includes a tubular extension piece 21. Two pulse-generator wheels 22a, 22b preferably are secured to the outside periphery of the extension piece 21, as illustrated. Alternatively, the pulse-generator wheels 22a, 22b may be manufactured as an integral part of the tubular extension 21.

The pulse-generator wheels 22a, 22b are connected operationally to a sensor (or sensors) (not shown) that is(are) mounted rigidly on the engine crankcase. In conjunction with the sensor(s), the pulse-generator wheels 22a, 22b determine the precise angular position of the crankshaft 6.

The rotor 23 of a first alternator 16a is secured to the inner periphery of the extension piece 21. A second alternator 16b is arranged on the opposite end of the crankshaft 6 in the drive line to the propeller 4a. The alternators 16a, 16b and the sensor wheels 22a and 22b are duplicated so as to provide the redundancy that is required for aircraft operation and to ensure the safety of the aircraft in the event of failure of one of the two components.

The reduction gearing 3 for reducing the speed of the crankshaft 6 is arranged at the other end of the crankshaft 6, between the propeller 4a and the crankshaft 6. The reduction gearing 3 is accommodated within a reduction gear housing 3a. In the example shown, the reduction gearing 3 essentially comprises a driving pinion 12 and a driven gear wheel 13 that is mounted on the propeller shaft 4. The high crankshaft speed is reduced by the transmission ratio between the two gear wheels 12, 13. The propeller shaft 4 is supported by and rotates within the reduction gear housing 3a. The end face of the reduction gear housing 3a is a flange mounted to the cylinder block 2a.

In order to make the drive line torsionally soft, a torsion bar 14 is arranged between the crankshaft 6 and the pinion 12. This torsion bar 14 ensures that, on the one hand, the natural basic frequency of the overall drive line is lowered and that, on the other hand, higher frequency torsional oscillations are cushioned or reduced. The torsion bar 14 is advantageously installed in the crankshaft 6 or the pinion 12 by way of splines 18a or 18b, respectively. The torsion bar 14 can be supported directly in the crankshaft 6 or, as in the embodiment shown in the drawings, in a replaceable sleeve 19. The latter arrangement entails the advantage that when the spline 18a wears, only the sleeve 19 need be replaced. As would be appreciated by those skilled in the art, while not illustrated, spline 18b also may be supported in a replaceable sleeve.

Taken together, the required low torsional rigidity of the torsion bar 14 and the maximal engine torque that is to be transmitted determine the specific length of the torsion bar 14. In order to avoid the installed length of the engine being any longer than necessary, the pinion 12 is formed as a hollow shaft 12a and encloses a large proportion of the torsion bar 14. In this way, the drive line can be kept very compact. The hollow shaft 12a is also supported within the reduction gear housing 3a. Other components, such as a belt pulley 20, which drive additional assemblies (not shown in FIG. 1) are also mounted on the hollow shaft 12, outside the reduction gear housing 3a. The rotor of the second alternator 16b is mounted on the inner periphery of the belt pulley 20. The stator of the alternator 16b is attached to the transmission housing 3a.

In the present embodiment, the torsion bar 14 is arranged between the reduction gearing 3 and the crankshaft 6. As an alternative, it would be possible to position the torsion bar 14 between the propeller 4a and the reduction gearing 3. However, such an arrangement entails a number of disadvantages. First, the torsionally soft and flexible torsion bar 14 cannot absorb any bending moments itself. Bending moments are unavoidable since they are induced during different aerial manoeuvres because of the gyroscopic effects generated by the propeller. Thus, in this alternative arrangement, a hollow shaft that is resistant to bending would have to be provided around the torsion bar. Second, from the design standpoint, there is a conflict with the oil supply line 15 for adjusting the setting of the propeller blades. To accommodate this design limitation, the torsion bar itself would have to be hollow. Third, it is possible with this alternative design that higher frequency vibrations of the crankshaft could pass unhindered into the reduction gear housing 3, where they could cause some or all of the problems discussed heretofore.

Figure 2:
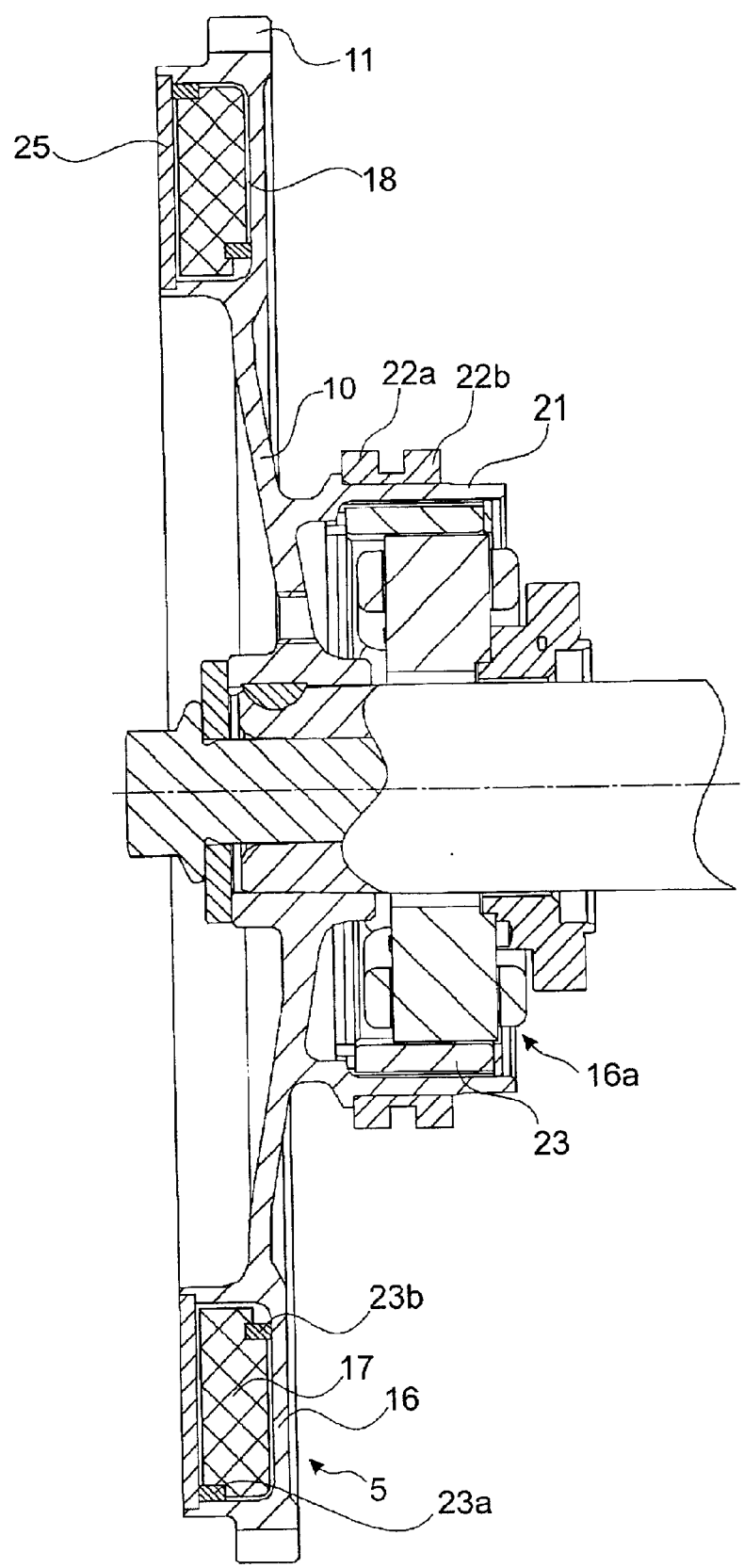
FIG. 2 is a side view of a viscous damper for a drive unit according to the present invention, in partial cross section.

The torsional-vibration damper 5 is configured as a viscous damper (FIG. 2). The viscous damper comprises a housing 16 that is integrated into the disk flywheel 10. An annular body or flywheel ring 17 is so arranged within this housing 16 that there is a gap or clearance 18 around the periphery, between the annular body 17 and the housing 16. To this end, there are two bearing rings 23a and 23b on two diagonally opposed corners of the annular body 17, the first bearing ring 23a being positioned directly in the outside corner of the annular body 17, and the second bearing ring 23b being positioned in the inside corner so as to be somewhat offset radially. In this way, the bearing rings 23a, 23b define the geometry of the gap 18 between the annular body 17 and the housing 16.

In the preferred embodiment of the present invention, the annular body 17 is of rectangular cross section and is usually made of steel. However, as would be appreciated by those skilled in the art, the annular body 17 may have any suitable cross-sectional shape. Moreover, the annular body 17 may be constructed from any suitable alternative material other than steel. The bearing rings 23a and 23b are also of rectangular cross section and are usually of plastic, for example Teflon (otherwise known as polytetrafluoroethylene or PTFE). Again, while this shape and material are the preferred materials selected for the embodiment of the present invention illustrated, those skilled in the art would readily recognize that other shapes and materials may be selected without deviating from the present invention.

The gap 18 between the housing 16 and the annular body 17 is filled with a viscous liquid. In the preferred embodiment of the present invention, the viscous liquid is a silicon oil. However, as would be appreciated by those skilled in the art, any other suitable liquid may be substituted therefor.

The housing 16 is hermetically sealed by an annular disk or a cover 25. Preferably, the cover 25 is usually welded to the housing 16 by a laser welding process. However, those skilled in the art would readily recognize that there are any number of suitable attachment alternatives.

If the housing 16 and the annular body 17 rotate at different speeds, shear stresses, i.e., internal friction, will be generated in the viscous liquid, which will then form a more or less rigid coupling between the housing 16 and the annular body 17, depending on the size of the difference in the two speeds. This will provide for more or less intensive damping of the vibrations in the drive line. Energy is dissipated from the oscillating system by this damping.

In addition to this dissipative damping or frictional effect, there is also (within certain limits) a mass damping effect, which is brought about by elastic effects due to interaction between the annular body 17 and the viscous liquid in the gap 18. Because of this mass damping effect, the oscillating system can be detuned. In other words, the natural frequency of the oscillating system can be shifted and rendered harmless thereby. The vibration-damping and mass-damping properties of the torsional-vibration damper 5 are, thus, determined essentially by the geometry of the gap 18, by the inertial moment of the annular body 17, and by the rheological characteristics of the viscous liquid in the gap 18.

The torsional-vibration damper 5 is so designed that it counteracts mainly the resonant frequency (base oscillation) of the torsionally soft drive line, which comprises the crankshaft 6, the torsion bar 14, the reduction gearing 3, and the propeller 4a. The effective range of the torsional-vibration damper 5 is, however, so wide that even higher frequency oscillations are damped. Thus, there are no torsional oscillations of undesirably high amplitudes—which could essentially reduce the service life of the drive unit 1—across the whole speed range of said drive unit.

The foregoing description is meant to be illustrative of a few embodiments encompassed within the broad scope of the present invention and is not intended to limit the scope thereof. It is understood that those skilled in the art would readily appreciate variations on the embodiments described without deviating from the scope of the present invention as defined in the appended claims.

What is claimed is:

1. A drive unit, comprising:
   an air propeller; and
   an internal combustion engine comprising
   a crankshaft defining first and second ends,
   a transmission disposed between the first end of the crankshaft and the air propeller, operatively connecting the air propeller to the crankshaft, the transmission comprising a reduction gearing for reducing the speed of the crankshaft,
   a torsion bar disposed between the first end of the crankshaft and the transmission, operatively connecting the crankshaft to the transmission, and
   a torsional vibration damper operatively connected at one of the first or the second ends of the crankshaft.

2. An internal combustion engine for an aircraft, comprising:
   a crankshaft defining first and second ends;
   a propeller;
   a transmission disposed between the first end of the crankshaft and the propeller, operatively connecting the propeller to the crankshaft;
   a torsion bar disposed between the first end of the crankshaft and the transmission, operatively connecting the crankshaft to the transmission; and
   a torsional vibration damper operatively connected at one of the first or the second ends of the crankshaft,
   wherein the torsional vibration damper is a viscous damper.

3. The drive unit of claim 2, wherein the torsional vibration damper is disposed at the second end of the crankshaft.

4. The drive unit of claim 2, wherein the torsional vibration damper is disposed at the first end of the crankshaft.

5. The internal combustion engine of claim 4, wherein the torsional vibration damper comprises:
   a flywheel;
   a housing disposed at a peripheral portion of the flywheel;

an annular body disposed within the housing such that a gap exists between the annular body and the housing; and a viscous fluid disposed within the gap.

6. The internal combustion engine of claim 5, wherein the housing is integrated within the flywheel.

7. The internal combustion engine of claim 5, wherein the viscous fluid comprises silicon oil.

8. The internal combustion engine of claim 5, wherein the torsional vibration damper further comprises:

first and second rings disposed between the annular body and the housing at diagonally-opposed regions of the annular body to position the annular body within the housing such that the gap is maintained between the annular body and the housing.

9. The internal combustion engine of claim 8, wherein the first and second rings comprise plastic.

10. The internal combustion engine of claim 6, wherein the flywheel comprises: a starter gear being disposed at an outer periphery thereof.

11. The internal combustion engine of claim 10, wherein the starter gear is integrally formed on the outer periphery of the flywheel.

12. The internal combustion engine of claim 5, wherein the flywheel further comprises:

a tubular extension connected to the flywheel at one side thereof.

13. The internal combustion engine of claim 12, wherein the tubular extension is integrally formed as a part of the flywheel.

14. The internal combustion engine of claim 12, wherein the tubular extension comprises:

at least one pulse-generator wheel affixed to a peripheral surface thereof, wherein the pulse-generator wheel operates in connection with at least one sensor to establish a rotational position of the crankshaft.

15. The internal combustion engine of claim 12, wherein the tubular extension comprises:

a rotor of an alternator affixed to a peripheral surface thereof.

16. The internal combustion engine of claim 4, further comprising:

a replaceable sleeve disposed between the crankshaft and the torsion bar, operatively connecting the crankshaft to the torsion bar.

17. An aircraft, comprising:

a fuselage;

at least one wing attached to the fuselage to provide a lifting force upon movement of the wing through, air; and at least one aircraft drive unit comprising an air propeller, and an internal combustion engine comprising a crankshaft defining first and second ends, a transmission disposed between the first end of the crankshaft and the air propeller, operatively connecting the air propeller to the crankshaft, the transmission comprising a reduction gearing for inducing the speed of the crankshaft, a torsion bar disposed between the first end of the crankshaft and the transmission, operatively connecting the crankshaft to the transmission, and a torsional vibration damper operatively connected at one of the first or the second ends of the crankshaft.

18. An aircraft, comprising:

a fuselage; and at least one wing attached to the fuselage to provide a lifting force upon movement of the wing through air, wherein the fuselage is powered by an internal combustion engine comprising a crankshaft defining first and second ends, a propeller, a transmission disposed between the first end of the crankshaft and the propeller, operatively connecting the propeller to the crankshaft, a torsion bar disposed between the first end of the crankshaft and the transmission, operatively connecting the crankshaft to the transmission, and a torsional vibration damper operatively connected at one of the first or the second ends of the crankshaft, wherein the torsional vibration damper is a viscous damper.

19. The aircraft of claim 18, wherein the torsional vibration damper is disposed at the second end of the crankshaft.

20. The aircraft of claim 18, wherein the torsional vibration damper is disposed at the first end of the crankshaft.

21. The aircraft of claim 18, wherein the torsional vibration damper comprises:

a flywheel;

a housing disposed at a peripheral portion of the flywheel;

an annular body disposed within the housing such that a gap exists between the annular body and the housing; and a viscous fluid disposed within the gap.

22. The aircraft of claim 21, wherein the housing is integrated within the flywheel.

23. The aircraft of claim 21, wherein the viscous fluid comprises silicon oil.

24. The aircraft of claim 21, wherein the torsional vibration damper further comprises:

first and second rings disposed between the annular body and the housing at diagonally-opposed regions of the annular body to position the annular body within the housing such that the gap is maintained between the annular body and the housing.

25. The aircraft of claim 24, wherein the first and second rings comprise plastic.

26. The aircraft of claim 22, wherein the flywheel comprises:

a starter gear being disposed at an outer periphery thereof.

27. The aircraft of claim 26, wherein the starter gear is integrally formed on the outer periphery of the flywheel.

28. The aircraft of claim 21, wherein the flywheel further comprises:

a tubular extension connected to the flywheel at one side thereof.

29. The aircraft of claim 28, wherein the tubular extension is integrally formed as a part of the flywheel.

30. The aircraft of claim 28, wherein the tubular extension comprises:

at least one pulse-generator wheel affixed to a peripheral surface thereof, wherein the pulse-generator wheel operates in connection with at least one sensor to establish a rotational position of the crankshaft.

31. The aircraft of claim 28, wherein the tubular extension comprises:

a rotor of an alternator affixed to a peripheral surface thereof.

32. The aircraft of claim 20, further comprising:

a replaceable sleeve disposed between the crankshaft and the torsion bar, operatively connecting the crankshaft to the torsion bar.

\* \* \* \* \*